United States Patent
Aquillue et al.

(10) Patent No.: US 9,902,301 B2
(45) Date of Patent: Feb. 27, 2018

(54) SLEEVE DEVICE FOR A HEADREST

(71) Applicant: ILLINOIS TOOL WORKS INC., Glenview, IL (US)

(72) Inventors: Alberto Lardies Aquillue, Glenview, IL (US); Jordi Bielsa Bonet, Glenview, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 153 days.

(21) Appl. No.: 14/758,160

(22) PCT Filed: Dec. 11, 2013

(86) PCT No.: PCT/US2013/074376
§ 371 (c)(1),
(2) Date: Jun. 26, 2015

(87) PCT Pub. No.: WO2014/105430
PCT Pub. Date: Jul. 3, 2014

(65) Prior Publication Data
US 2015/0329021 A1    Nov. 19, 2015

(30) Foreign Application Priority Data

Dec. 28, 2012   (EP) .................................... 12199679

(51) Int. Cl.
*B60N 2/48* (2006.01)
*A47C 7/38* (2006.01)

(52) U.S. Cl.
CPC ............. *B60N 2/48* (2013.01); *B60N 2/4808* (2013.01); *A47C 7/38* (2013.01); *B60N 2/4814* (2013.01);

(Continued)

(58) Field of Classification Search
CPC ...... B60N 2/48; B60N 2/4808; B60N 2/4817; B60N 2/4814; A47C 7/38
(Continued)

(56) References Cited

U.S. PATENT DOCUMENTS 5,944,170 A    8/1999   LaVeine et al.
7,165,814 B2*  1/2007   Gans .................... B60N 2/4808
                                                    297/391

(Continued)

FOREIGN PATENT DOCUMENTS

CN    201961194 U    9/2011
DE    29801357 U1    6/1998
(Continued)

OTHER PUBLICATIONS

ISR and WO for PCT/US2013/074376 dated May 2, 2014.

*Primary Examiner* — Syed A Islam
(74) *Attorney, Agent, or Firm* — Hauptman Ham, LLP

(57) ABSTRACT

A sleeve device for a headrest comprising a sleeve body to be inserted into an opening in a frame of a vehicle seat, the sleeve body comprising an inner axial passage to accommodate a rod of the headrest, the inner axial passage including an inner wall, a top end portion and a bottom end portion; a head portion; an external side; and an upper inner seat portion at the inner the wall of the top end portion of the axial passage, the upper inner seat portion for encircling an upper portion of the rod of the headrest; and an upper inner bushing overmoulded to the upper inner seat portion, the upper inner bushing being made from an antifriction resilient plastic material and comprising an inner axial opening for guiding the rod of the headrest.

26 Claims, 4 Drawing Sheets

C-C

(52) U.S. Cl.
CPC .. *B60N 2002/4897* (2013.01); *B60N 2205/20* (2013.01)

(58) Field of Classification Search
USPC .................................................. 297/391, 410
See application file for complete search history.

(56) References Cited

U.S. PATENT DOCUMENTS

| | | | |
|---|---|---|---|
| 7,370,915 B2* | 5/2008 | Droche | B60N 2/4817 297/391 |
| 2006/0012225 A1 | 1/2006 | Gans | |
| 2006/0119163 A1 | 6/2006 | Gans et al. | |

FOREIGN PATENT DOCUMENTS

| | | | | |
|---|---|---|---|---|
| EP | 0875471 | A1 | 11/1998 | |
| EP | 1609665 | A2 | 12/2005 | |
| EP | 1652723 | A2 | 5/2006 | |
| FR | 2917681 | A1 | 12/2008 | |
| FR | 2936749 | A1 | 4/2010 | |
| JP | 1089665 | A | 4/1998 | |
| WO | WO-2016166009 | A1 * | 10/2016 | ........... B60N 2/4808 |

* cited by examiner

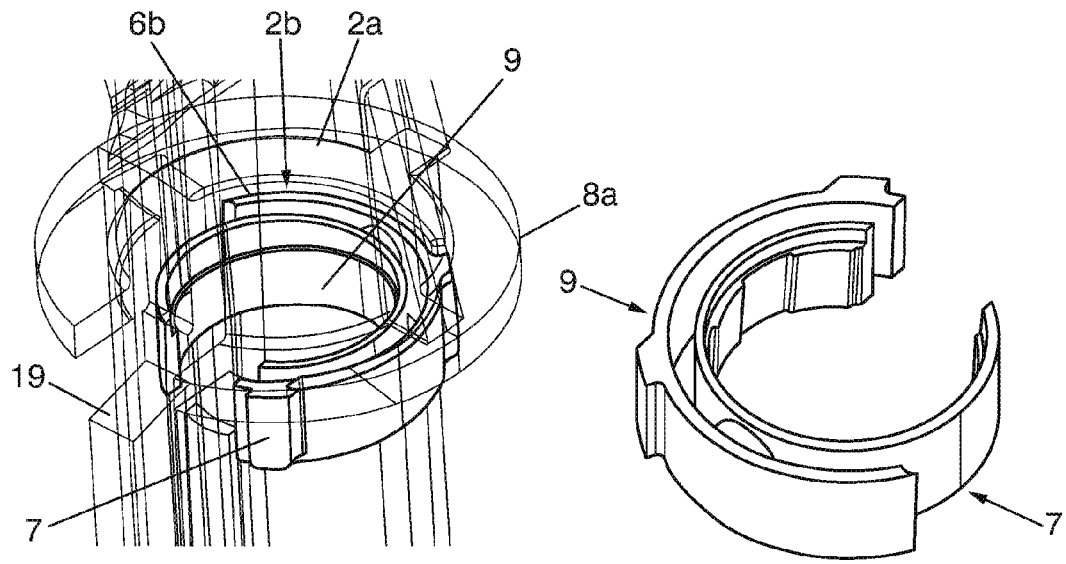
FIG. 2
FIG. 3
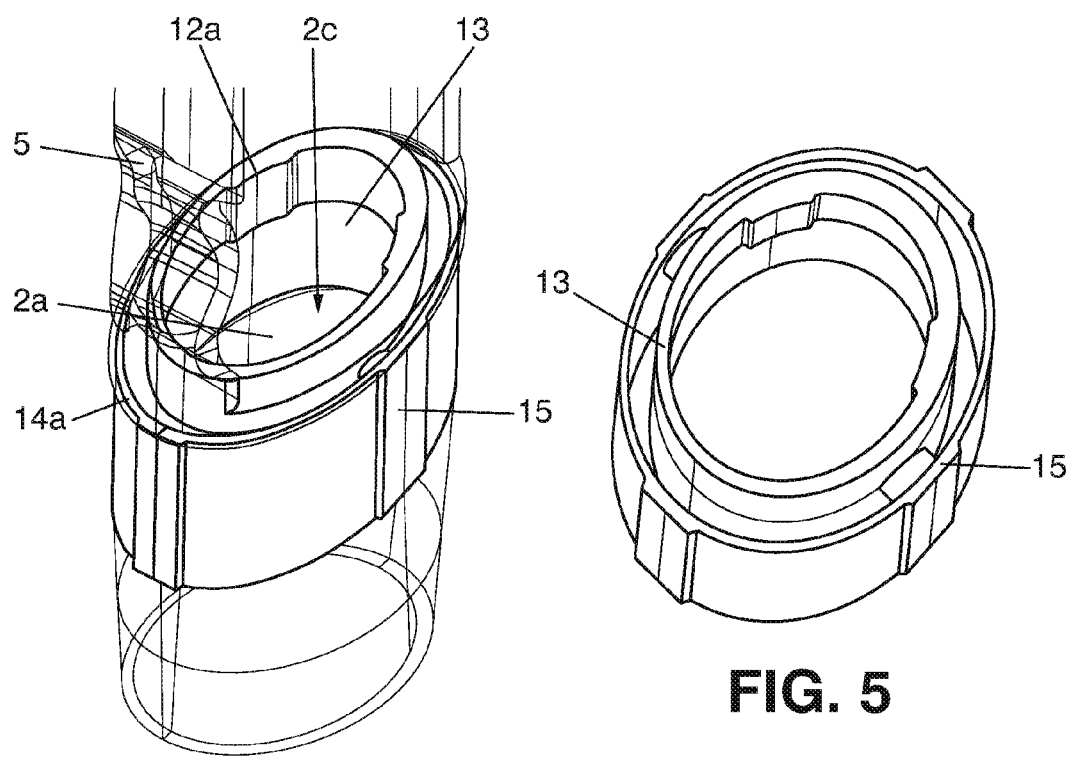
FIG. 4
FIG. 5

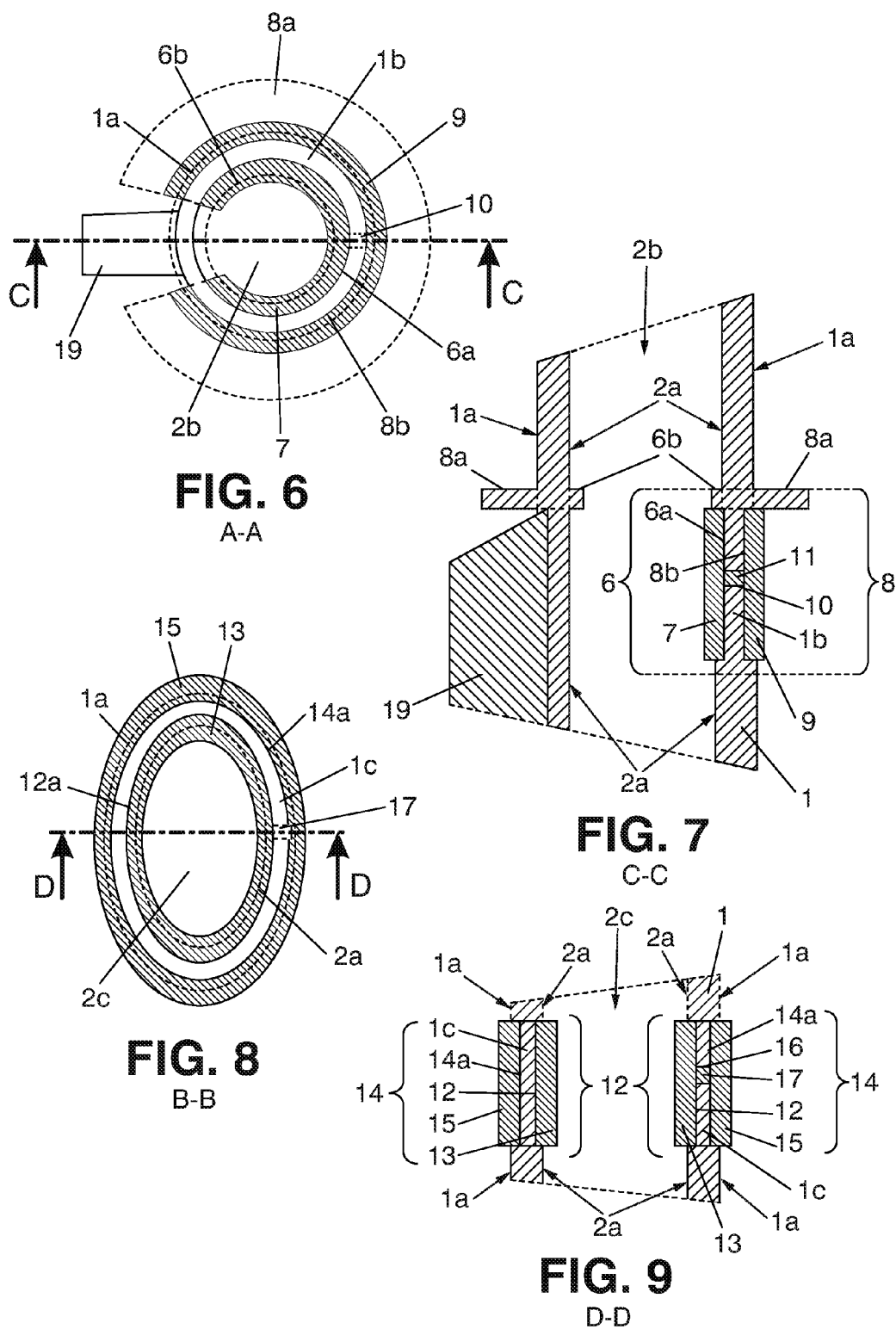

SLEEVE DEVICE FOR A HEADREST

RELATED APPLICATIONS

The present application is a National Phase of International Application Number PCT/US2013/074376 filed Dec. 11, 2013, and claims priority from European Application Number 12199679.7 filed Dec. 28, 2012.

TECHNICAL FIELD OF THE INVENTION

The present invention lies within the technical field of automotive industry and, particularly, in the fields of sleeve devices or bezels for headrests for vehicle seats.

BACKGROUND OF THE INVENTION

Headrests installed on the seat back rests of vehicles have usually two parallel spaced rods of the headrest, which are accommodated in sleeve arrangements for the headrest, which are fixed on the frame of the back rest. The headrest rods are often bent in a U-shape. The bridge of the U-shaped portion is located inside of the headrest. Known sleeve devices for headrests are comprised of a sleeve body to be inserted into an opening in a frame of a vehicle seat. The sleeve body includes an inner axial passage to accommodate a rod of the headrest and an external side provided with fixing means to fix the sleeve body in the opening of the frame. The inner axial passage comprises an inner wall, a top end portion and a bottom end portion. A head portion with internal locking means to fix de rod of the headrest in at least one axial position in the sleeve body is provided. The head portion is equipped with a locking means, which co-operates with grooves such as a toothing or the like in the rod of the headrest, so that it is possible to arrest the headrest at a predetermined height or to change the desired height of the headrest, respectively. Further, it is known to make the head portion and the sleeve body portion into a one-piece sleeve body made of plastic material. A sleeve device of this kind is disclosed for example in EP-0875471-A1.

The sleeve body is fixed in a frame of the back rest of the seat, and it is thus subject to tolerances. The sleeve device and the U-shaped rods are also subject to tolerances when it is manufactured. The distance between the rods for the headrest is not always exactly the same, so that, when said distance does not correspond to the distance between the axes of the installed sleeve devices, the rods have to be bent somewhat, either away from each other or towards each other. However, by doing so they are no more exactly parallel. In addition to the problems associated to the distance between rods, noise problems are also originated due to the presence of gaps between the external diameter of the metal rods and the diameter of the holes, lack or parallelism between holes or the tubes of the frames. A solution to these problems, would be to design the sleeve and rod to fit tightly with each other to avoid any gap in between, however in that case, the metal rods would not slide smoothly along the sleeves. Therefore, it is desirable to obtain a good balance between noise problems known as BSR (Buss Squeak Rattle) and a nice feeling in the movement of the headrest with a reasonable sliding effort for the user.

In order to compensate the individual tolerances, the accommodation of the rod of a headrest in a sleeve device has to admit variances. However, these variances entail the possibility of generating noise in the sleeve devices during driving by a vibration of the headrest or of the rods of the headrest, respectively, which is unpleasant for the user of the seat, particularly as it is generated in the region of the ears of the user. In this context, it has already become known to pre-stress the headrest rods inside the sleeve body by springs, in order to regulate the sliding movement of the rod within the axial inner passage of the sleeve body and to dampen the said noise. However, with these known means, damping of the noise can only be achieved in an insufficient manner.

To provide enhanced damping, sleeve devices comprising bushings or rings of flexible material antifriction material to engage the sleeve body to the frame or to guide the rod in the axial inner passage of the sleeve body have designed, so that transmission of vibrations from the frame to the rod of the headrest and generation of noise is reduced.

FR-2917681-A1 discloses a sleeve device for headrests comprising a spacing dispersion adjustment device with elastomeric elements placed, between the frame and the sleeve body at both sides of the sleeve body. The structure of this sleeve device is rather complex and, moreover, no noise-dampening is provided between the rod and the sleeve body.

JP-1089665 discloses a sleeve device where elastomeric elements are positioned between the head and the sleeve body so as to dampen the transmission of vibrations from the frame to the headrest.

EP-1609665-A2 discloses a sleeve device for a headrest with tolerance compensation, comprising a sleeve body of plastic material for the accommodation of a rod of the neck rest, the sleeve body including at least one integrally formed resilient portion which is biased towards the interior of a sleeve body against an accommodated rod, where a wire portion is attached to the outer side of the sleeve body parallel to the axis of the sleeve body such that the wire portion can be resiliently deflected away from the sleeve body, the wire portion engaging the outer side of the resilient portion. In this sleeve device, dampening of the transmission of vibrations from the sleeve body to the rod of the headrest is rather poor. Moreover, the structure is rather complex and relatively difficult to manufacture.

FR-2936749-A1 discloses a sleeve device with a sleeve body for slidably receiving a rod of a headrest which includes a plastic sheath, and which has an inner transversal dimension larger than a transversal dimension of the rod to permit the rod to slide between upper and lower positions. A free end part of the rod extends outside an inner tubular envelope, such that a lower part of the sleeve presents a clearance with the rod in a lower position of a head-rest assembling frame and is transversally supported against the rod in an upper position of the frame. The sheet body comprises an upper portion of a hard plastic material, and a lower portion made of a resilient elastomeric material that avoids transmissions of vibrations from the frame to the rod of the headrest and to adapt itself to deviations of the rods when inserted into the sleeve body. This structure provides a rather poor guidance of the rod within the resilient lower portion of the sleeve body, and is moreover complex to manufacture.

EP-1652723-A2 discloses a sleeve device for a headrest, comprising a sleeve body adapted to be inserted into an opening in a frame of a vehicle seat, the sleeve body having a through going axial passage adapted to accommodate a rod of the neck rest, and the sleeve body having further a head portion which includes internal locking means to fix the axial position of the rod in the sleeve body and a shank portion joining the head portion, the sleeve body having an external side which includes means to fix the sleeve body in the opening of the frame, wherein in upper and lower end portions the passage has radially annular enlargements, and a preferably radially expandable sliding bushing of anti-frictional plastic material is accommodated by the enlargements which encircle the rod, and an elastomeric material is accommodated in the intermediate space between the sliding bushing and a wall of the passage. The bushings are made of a hard material whilst the elastomeric material is an elastomeric plastic foam, preferably PUR-foam. Whilst the dampening effect achieved by this structure is acceptable, manufacturing the sleeve device is rather complex as it requires insertion of each of the bushings followed by injection of the elastomeric material into the intermediate space between the sliding bushing and a wall of the passage.

DESCRIPTION OF THE INVENTION

The present invention is intended to overcome the above described drawbacks of prior art by providing a sleeve device for a headrest comprising a sleeve body to be inserted into an opening in a frame of a vehicle seat, the sleeve body comprising an inner axial passage to accommodate a rod of the headrest, the inner axial passage including an inner wall, a top end portion and a bottom end portion; a head portion with internal locking means to fix de rod of the headrest in at least one axial position in the sleeve body; an external side including fixing means to fix the sleeve body in the opening of the frame; and an upper inner seat portion at the inner the wall of the top end portion of the axial passage, the upper inner seat portion for encircling an upper portion of the rod of the headrest; and an upper inner bushing retained at the upper inner seat portion, the upper inner bushing being made from an antifriction resilient and soft plastic material and comprising an inner axial opening for guiding the rod of the headrest;

wherein the upper inner bushing is overmoulded to the upper inner seat portion. The upper inner bushing, which can be slit or parted, may be made of a material selected from thermoplastic elastomers, thermoplastic polyurethanes and styrene ethylbutylene styrene.

In an embodiment of the invention, the sleeve device further comprises an upper external seat portion at the external side of the sleeve body and an upper external bushing retained at said upper external seat portion. The upper external seat portion is located such that the upper external bushing is at least partially located opposed to the upper inner hushing, such that the upper external bushing and the upper inner bushing embrace a upper intermediate portion of the sleeve body. Preferably the upper external bushing which may also be slit or parted, is overmoulded to the upper external seat portion. The upper external bushing may be made of a material selected from thermoplastic elastomers, thermoplastic polyurethanes and styrene ethylbutylene styrene.

Slit or parted bushings are apt to be radially expanded in a traverse movement to the rod. Thus, when the rod exerts traverse movements upon shocks transmitted by the backrest of the vehicle, these shocks are dampened by the expansion of the bushings.

The upper inner seat portion may comprise an internal recess in the inner wall of the inner axial passage, to accommodate the upper inner bushing, and/or an internal flange protruding radially from the inner wall of the inner axial passage into the top end portion of the inner axial passage, for supporting a bottom edge portion of the upper inner bushing. In turn, the upper external seat portion may comprise an external recess in the external side of the sleeve body, to accommodate the upper external bushing, and/or an external flange protruding radially from external side of the sleeve body such that a top edge portion of the upper external bushing abuts thereagainst.

Preferably, the upper intermediate portion of the sleeve body embraced by the upper external bushing and the upper inner bushing comprises at least one connection opening, and the upper external bushing and the upper inner bushing are made from the same material overmoulded to respective sides of said upper intermediate wall portion such that the upper external bushing and the upper inner bushing are connected to each other by a connecting portion extending through the connection opening.

In a preferred embodiment of the invention, the sleeve body further comprises a lower inner seat portion at the inner wall of the bottom end portion of the axial passage, the lower inner seat portion encircling a lower portion of the rod of the headrest, and a lower inner bushing retained at the lower inner seat portion within the bottom end portion of the axial passage, the lower inner bushing being made from an antifriction resilient and soft plastic material comprising an inner axial opening for guiding the rod of the headrest. The lower inner seat portion may comprise an internal recess in the inner wall of the inner axial passage to accommodate the lower inner bushing. Preferably, the lower inner bushing is overmoulded to the lower seat portion, and may be made of a material selected from thermoplastic elastomers, thermoplastic polyurethanes and styrene ethylbutylene styrene.

In other preferred embodiments of the invention the overmoulded bushing may be provided only at the upper inner and/or external seat portion, or only at the lower inner and/or external seat portion.

Preferably, the sleeve body also comprises a lower external seat portion at the external side of the sleeve body. A lower external bushing is retained at said lower external seat portion, the lower external seat portion being located such that the lower external bushing is located is at least partially located opposed to the lower inner bushing, such that the lower external bushing and the lower inner bushing embrace a lower intermediate portion of the sleeve body. The lower external seat portion may comprise an external recess in the external side of the sleeve body, to accommodate the lower external bushing. Preferably, the lower external bushing is overmoulded to the lower external seat portion and made, for example, of a material selected from thermoplastic elastomers, thermoplastic polyurethanes and styrene ethylbutylene styrene Preferably, the lower intermediate wall portion of the sleeve body embraced by the lower external bushing and the lower inner bushing comprises at least one connection opening. The lower external bushing and the lower inner bushing are made from the same material overmoulded to respective sides of said lower intermediate wall portion such that the lower external bushing and the lower inner bushing are connected to each other by a connecting portion extending through the connection opening.

Overmoulding the bushings provides secure positioning thereof at their respective seat portions and moreover, allows mounting the bushing in one single manufacturing step.

BRIEF DESCRIPTION OF THE DRAWINGS

Hereinafter, aspects and embodiments of the invention will be described on the grounds of drawings wherein

FIG. 2 is a partially sectioned perspective view of a part of the top end portion of the sleeve device shown in FIG. 1;

FIG. 3 is perspective view of an upper inner bushing and an upper external bushing shown overmoulded in FIG. 2;

FIG. 4 is a partially sectioned perspective view of the bottom end portion of a part of the sleeve device shown in FIG. 1;

FIG. 5 is perspective view of a lower inner bushing and a lower external bushing shown overmoulded in FIG. 2;

FIG. 6 is a cross sectional view along line A-A of the top end portion of the sleeve device shown in FIG. 1;

FIG. 7 is a partial sectional view along line C-C shown in FIG. 6;

FIG. 8 is a cross sectional view along line B-B of the bottom end portion of the sleeve device shown in FIG. 1;

FIG. 9 is a partial sectional view along line D-D shown in FIG. 8.

Figure 1:
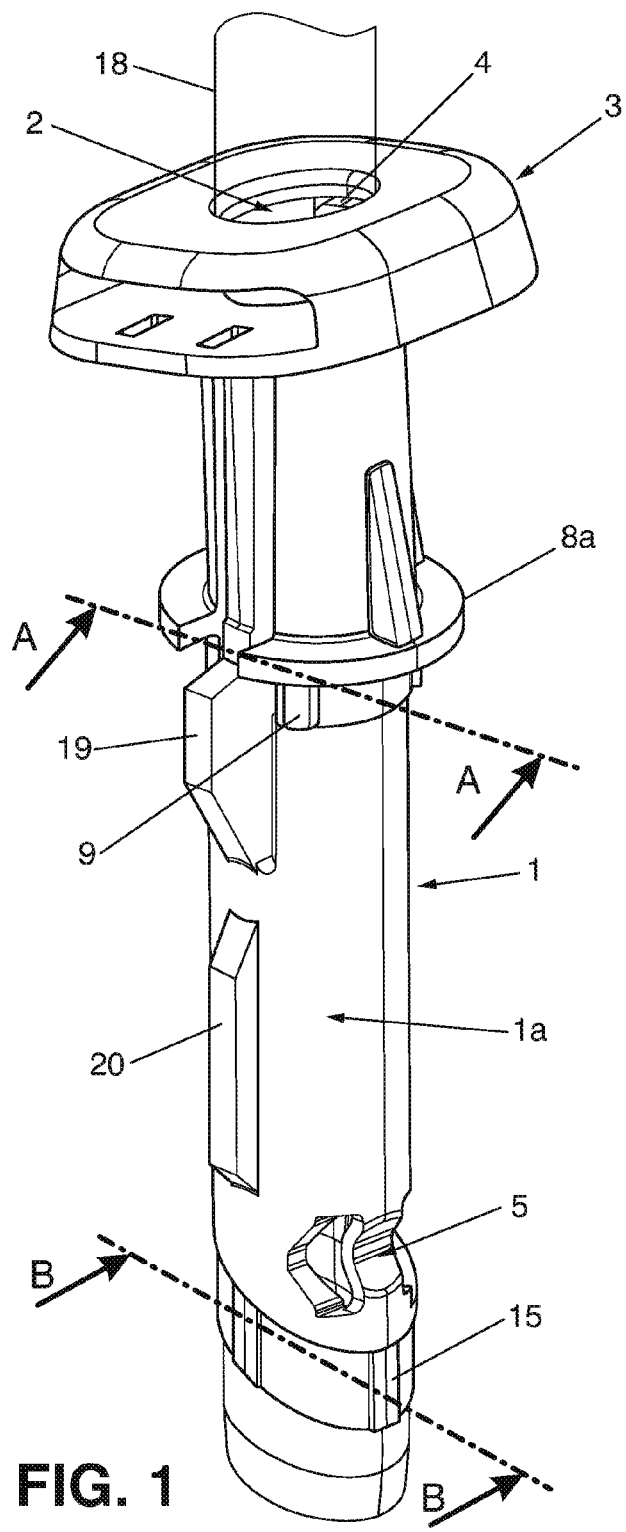
FIG. 1 is an elevational view of a sleeve device according to an embodiment of the invention.
Figure 10:
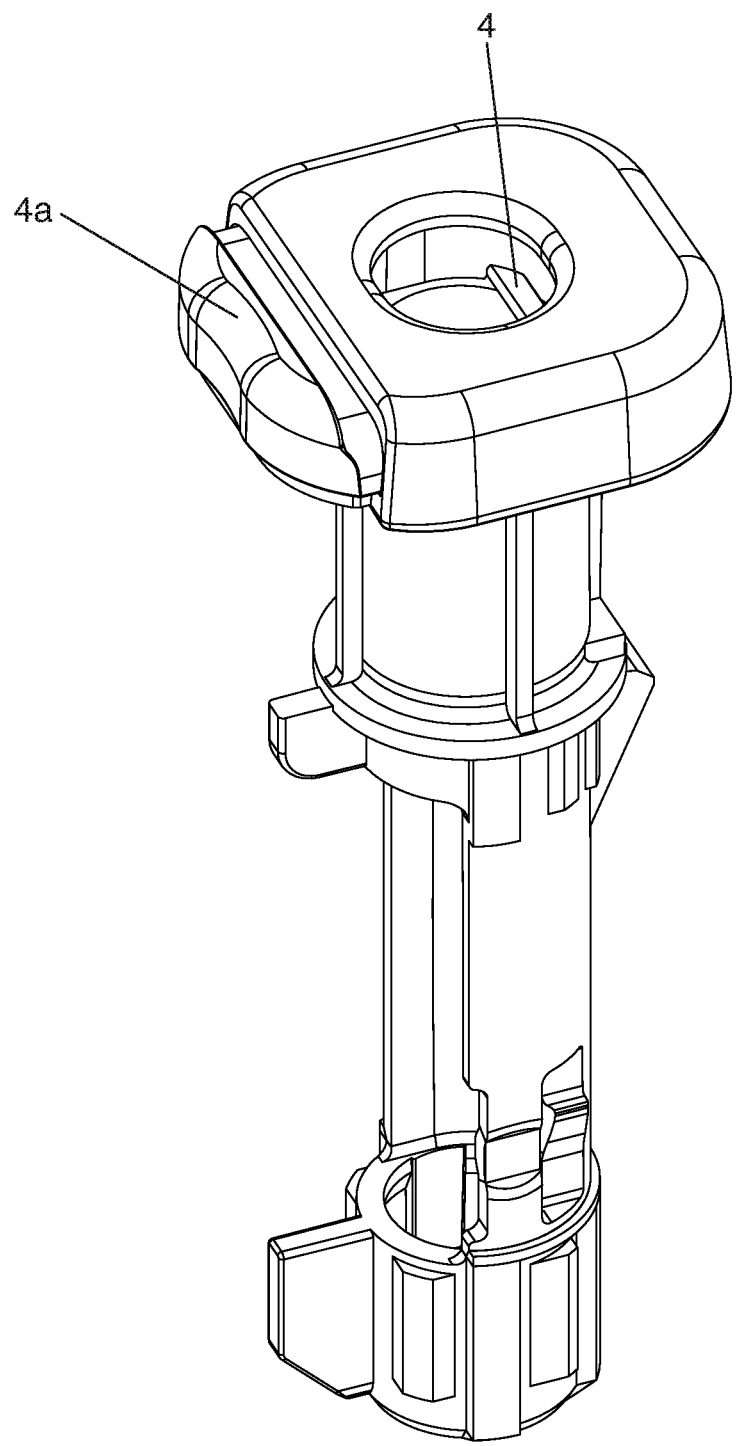
FIG. 10 is another perspective view of the sleeve device of the invention.

In these figures, there are references identifying the following elements 1 sleeve body
1a external side
1b upper intermediate portion
1c lower intermediate wall portion
2 inner axial passage
2a inner wall
2b top end portion
2c bottom end portion
3 head portion
4 internal locking means
4a actuator plate
5 fixing means
6 upper inner seat portion
6a internal recess
6b internal flange
7 upper inner bushing
8 upper external seat portion
8a external flange
9 upper external bushing
10 connection opening
11 connecting portion
12 lower inner seat portion
12a internal recess
13 lower inner bushing
14 external seat portion
14a external recess
15 lower external bushing
16 connection opening
17 connecting portion
18 rod of the headrest
19 upper guide rib
20 lower guide rib

EMBODIMENTS OF THE INVENTION

The embodiment sleeve device for a headrest shown in the figures comprises a sleeve body -1- to be inserted into an opening, tube or crossmember, in a frame of a vehicle seat (not shown in the drawings). The sleeve body -1- comprises a head portion -3- provided with per se conventional internal locking means -4- optionally actuated by means of an actuator plate -4a- to fix de rod -18- of the headrest in at least one axial position in the sleeve body -1-, an external side -1a- optionally including fixing means -5- to fix the sleeve body -1- in the opening of the frame, and an inner axial passage -2- to accommodate the rod -18- of the headrest, the inner axial passage -2- including an inner wall -2a-, a top end portion -2b- and a bottom end portion -2c-. The external side -1a- of the sleeve body -1- includes fixing means -5- to fix the sleeve body -1- in the opening of the frame, an axial upper guide rib -19- and an axial lower guide rib -20- to axially guide the sleeve body -1- within the frame.

At the top end portion -2b- the inner wall of the axial inner passage 2- comprises an upper inner seat portion -6- for encircling an upper portion of the rod -18- of the headrest. An upper inner bushing -7- is overmoulded to the upper inner seat portion -6-, the upper inner bushing -7- being made from an antifriction resilient and soft plastic material and comprising an inner axial opening for guiding the rod -18- of the headrest. At the external side -1a- of the sleeve body -1- there is an upper external seat portion -8-. An upper external bushing -9- is overmoulded to the upper external seat portion -8-. The upper external seat portion -8- is located such that the upper external bushing -9- is located opposed to the upper inner bushing. -7-, such that the upper external bushing -9- and the upper inner bushing -7- embrace a upper intermediate portion -1b- of the sleeve body -1-. The upper external bushing -9- and the upper inner bushing -7- are made from the same material, such as a material selected from thermoplastic elastomers, thermoplastic polyurethanes and styrene ethylbutylene styrene.

The upper intermediate portion -1b- of the sleeve body -1- comprises a connection opening -10-. When overmoulding the upper inner bushing .7- and the upper external bushing to the respective sides of said upper intermediate wall portion -1b- the upper external bushing -9- and the upper inner bushing -7- become connected to each other by a connecting portion -11- extending through the connection opening -11-.

The upper inner seat portion -6- comprises an internal recess -6a- in the inner wall -2a- of the inner axial passage -2-, to accommodate the upper inner bushing -7-, and an internal flange -6b- protruding radially from the inner wall -2a- of the inner axial passage -2- into the top end portion of the inner axial passage -2-, for supporting a bottom edge portion of the upper inner bushing -7-. On the other hand, the upper external seat portion -8- comprises an external flange -8a- protruding radially from external side 1a-of the sleeve body -1-, such that a top edge portion of the upper external bushing -9- abuts thereagainst, and an external recess -8b- in the external side -1a- of the sleeve body -1-, to accommodate the upper external bushing -9-.

The upper inner bushing -7- and the upper external bushing -9- are slit, so that they are apt to be radially expanded so as to be able of absorbing vibrations of the headrest and absorbing shocks transmitted to the backrest of the vehicle seat to the rod.

The sleeve body -1- further comprises a lower inner seat portion -12- at the inner wall -2a- of the bottom end portion -2c- of the axial passage -2-. The lower inner seat portion -12- encircles a lower portion of the rod -18- of the headrest. A lower inner bushing -13- is overmoulded to the lower inner seat portion -12- The lower inner bushing -13- is also made from an antifriction resilient plastic material comprising an inner axial opening for guiding the rod -18- of the headrest.

The sleeve device according further comprises a lower external seat portion -14- at the external side -1a- of the sleeve body -1- and a lower external bushing 45- retained at said lower external seat portion 44-. The lower external seat portion -14- is located such that the lower external bushing -15- is located is located opposed to the lower inner bushing -13-, such that the lower external bushing -15- and the lower inner bushing -15- embrace a lower intermediate portion -1c- of the sleeve body -1-. The lower inner bushing -13- and the lower external bushing -15- are of the same material, such as a material selected from thermoplastic elastomers, thermoplastic polyurethanes and styrene ethylbutylene styrene.

The lower intermediate wall portion -1c- of the sleeve body -1- embraced by the lower external bushing -15- and the lower inner bushing -13- comprises a connection opening -16-. As the lower external bushing -15- and the lower inner bushing -13- are made from the same material overmoulded to respective sides of said lower intermediate wall portion -1c-, the lower external bushing -15- and the lower inner bushing -13- are connected to each other by a connecting portion -17- extending through the connection opening -16-.

The lower inner seat portion -12- comprises an internal recess -12a- in the inner wall -2a- of the inner axial passage -2- to accommodate the lower inner bushing -13-. The lower external seat portion -14- comprises an external recess -14a- in the external side -1a- of the sleeve body -1-, to accommodate the lower external bushing -15-.

In other preferred embodiments of the invention the overmoulded bushing may be provided only at the upper inner and/or external seat portion, or only at the lower inner and/or external seat portion.

The sleeve device of the invention avoids BSR (Buss Squeak Rattle) problems, and it is capable of absorbing tolerances of the external diameter of the metal rods and the diameter of the holes, lack or parallelism between holes or the tubes of the frames, etc. At the same time, provides a nice feeling for the user in the movement of the headrest with a reasonable sliding effort.

Additionally, the sleeve device of the invention can be adapted to receive both straight and curved metal rods.

The invention claimed is:

1. A sleeve device for a headrest comprising
a sleeve body to be inserted into an opening in a frame of a vehicle seat, the sleeve body comprising an inner axial passage to accommodate a rod of the headrest, the inner axial passage including an inner wall, a top end portion and a bottom end portion; a head portion; an external side; and an upper inner seat portion at the inner wall of the top end portion of the axial passage, the upper inner seat portion for encircling an upper portion of the rod of the headrest; and
an upper inner bushing retained at the upper inner seat portion, the upper inner bushing being made from an antifriction resilient plastic and soft material and comprising an inner axial opening for guiding the rod of the headrest;
wherein the upper inner bushing is overmoulded to the upper inner seat portion, and
wherein the sleeve device further comprises an upper external bushing overmolded to the external side.

2. A sleeve device according to claim 1, wherein the upper inner bushing is made of a material selected from thermoplastic elastomers, thermoplastic polyurethanes and styrene ethylbutylene styrene.

3. A sleeve device according to claim 1, wherein the upper inner seat portion comprises an internal recess in the inner wall of the inner axial passage, to accommodate the upper inner bushing.

4. A sleeve according to claim 1, wherein the upper inner seat portion comprises an internal flange protruding radially from the inner wall of the inner axial passage into the top end portion of the inner axial passage, for supporting a bottom edge portion of the upper inner bushing and for supporting the metal rod.

5. A sleeve according to claim 1, wherein the upper inner bushing is slit or parted.

6. A sleeve device according to claim 1, wherein it further comprises an upper external seat portion at the external side of the sleeve body, wherein the upper external bushing is retained at said upper external seat portion, the upper external seat portion being located such that the upper external bushing is at least partially located opposed to the upper inner bushing, such that the upper external bushing and the upper inner bushing embrace an upper intermediate portion of the sleeve body.

7. A sleeve devise according to claim 6, wherein the upper external seat portion comprises an external flange protruding radially from external side of the sleeve body, such that a top edge portion of the upper external bushing abuts thereagainst.

8. A sleeve according to claim 6, wherein the upper external seat portion comprises an external recess in the external side of the sleeve body, to accommodate the upper external bushing.

9. A sleeve device according to claim 6, wherein the upper external bushing is slit or parted.

10. A sleeve device according to claim 6, wherein the upper external bushing is overmoulded to the upper external seat portion.

11. A sleeve device according to claim 10, wherein the upper external bushing is made of a material selected from thermoplastic elastomers, thermoplastic polyurethanes and styrene ethylbutylene styrene.

12. A sleeve device according to claim 6, wherein the upper intermediate portion of the sleeve body embraced by the upper external bushing and the upper inner bushing comprises at least one connection opening, and the upper external bushing and the upper inner bushing are made from the same material overmoulded to respective sides of said upper intermediate wall portion such that the upper external bushing and the upper inner bushing are connected to each other by a connecting portion extending through the connection opening.

13. A sleeve device according to claim 12, wherein the upper inner bushing and the upper external bushing are of a material selected from thermoplastic elastomers, thermoplastic polyurethanes and styrene ethylbutylene styrene.

14. A sleeve device according to claim 1, wherein the sleeve body further comprises a lower inner seat portion at the inner wall of the bottom end portion of the axial passage, the lower inner seat portion encircling a lower portion of the rod of the headrest, and a lower inner bushing retained at the lower inner seat portion within the bottom end portion of the axial passage, the lower inner bushing being made from an antifriction resilient plastic material comprising an inner axial opening for guiding the rod of the headrest.

15. A sleeve device according to claim 14, wherein the lower inner seat portion comprises an internal recess in the inner wall of the inner axial passage to accommodate the lower inner bushing.

16. A sleeve according to claim 14, wherein the lower inner bushing is overmoulded to the lower seat portion.

17. A sleeve device according to claim 16, wherein the lower inner bushing is made of a material selected from thermoplastic elastomers, thermoplastic polyurethanes and styrene ethylbutylene styrene.

18. A sleeve device according to claim 14, wherein it further comprises a lower external seat portion at the external side of the sleeve body and a lower external bushing retained at said lower external seat portion, the lower external seat portion being located such that the lower external bushing is located is at least partially located opposed to the lower inner bushing, such that the lower external bushing and the lower inner bushing embrace a lower intermediate portion of the sleeve body.

19. A sleeve devise according to claim 18, wherein the lower external seat portion comprises an external recess in the external side of the sleeve body, to accommodate the lower external bushing.

20. A sleeve device according to claim 18, wherein the lower external bushing is overmoulded to the lower external seat portion.

21. A sleeve device according to claim 18, wherein the lower external bushing is made of a material selected from thermoplastic elastomers, thermoplastic polyurethanes and styrene ethylbutylene styrene.

22. A sleeve device according to claim 18, wherein the lower intermediate wall portion of the sleeve body embraced by the lower external bushing and the lower inner bushing comprises at least one connection opening, and in that the lower external bushing and the lower inner bushing are made from the same material overmoulded to respective sides of said lower intermediate wall portion such that the lower external bushing and the lower inner bushing are connected to each other by a connecting portion extending through the connection opening.

23. A sleeve device according to claim 22, wherein the lower inner bushing and the lower external bushing are of a material selected from thermoplastic elastomers, thermoplastic polyurethanes and styrene ethylbutylene styrene.

24. A sleeve device according to claim 1, wherein the upper external bushing and the upper internal bushing are connected to each other by a connecting portion extending through a connection opening of the sleeve body.

25. A sleeve device for a headrest comprising
a sleeve body to be inserted into an opening in a frame of a vehicle seat, the sleeve body comprising an inner axial passage to accommodate a rod of the headrest, the inner axial passage including an inner wall, a top end portion and a bottom end portion; a head portion; an external side; and an upper inner seat portion at the inner wall of the top end portion of the axial passage, the upper inner seat portion for encircling an upper portion of the rod of the headrest; and
an upper inner bushing retained at the upper inner seat portion, the upper inner bushing being made from an antifriction resilient plastic and soft material and comprising an inner axial opening for guiding the rod of the headrest;
wherein the upper inner bushing is overmolded about the upper inner seat portion, and wherein the upper inner bushing is fixed to the sleeve body via a component extending through the sleeve body to an opposite side of the sleeve body, which component also extends about an outer surface of the sleeve body, preventing the upper inner bushing from moving.

26. A sleeve device for a headrest comprising
a sleeve body to be inserted into an opening in a frame of a vehicle seat, the sleeve body comprising an inner axial passage to accommodate a rod of the headrest, the inner axial passage including an inner wall, a top end portion and a bottom end portion; a head portion; an external side; and an upper inner seat portion at the inner wall of the top end portion of the axial passage, the upper inner seat portion for encircling an upper portion of the rod of the headrest; and
an upper inner bushing retained at the upper inner seat portion, the upper inner bushing being made from an antifriction resilient plastic and soft material and comprising an inner axial opening for guiding the rod of the headrest;
wherein the upper inner bushing is overmoulded to the upper inner seat portion, and
wherein the sleeve device further comprises an upper external bushing, wherein the upper external bushing and the upper internal bushing are connected to each other by a connecting portion extending through a connection opening of the sleeve body, the connecting portion being established by overmolding of the upper external bushing and the upper inner bushing.

\* \* \* \* \*